(12) United States Patent
Ueno et al.

(10) Patent No.: US 11,902,415 B2
(45) Date of Patent: Feb. 13, 2024

(54) SECURE COMPUTING DEVICE, SECURE COMPUTING METHOD, AND PROGRAM

(71) Applicant: TOHOKU UNIVERSITY, Miyagi (JP)

(72) Inventors: Rei Ueno, Sendai (JP); Naofumi Homma, Sendai (JP)

(73) Assignee: TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 17/632,062

(22) PCT Filed: Dec. 8, 2020

(86) PCT No.: PCT/JP2020/045643
§ 371 (c)(1),
(2) Date: Feb. 1, 2022

(87) PCT Pub. No.: WO2021/131667
PCT Pub. Date: Jul. 1, 2021

(65) Prior Publication Data
US 2022/0416994 A1 Dec. 29, 2022

(30) Foreign Application Priority Data
Dec. 24, 2019 (JP) .................................. 2019-232752

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ............................. H04L 9/008; H04L 9/0618
See application file for complete search history.

(56) References Cited

U.S. PATENT DOCUMENTS

| 9,094,378 B1* | 7/2015 | Yung | H04L 9/008 |
| 2015/0172258 A1* | 6/2015 | Komano | H04L 9/008 380/259 |
| 2017/0134157 A1 | 5/2017 | Laine et al. | |
| 2017/0149557 A1* | 5/2017 | Bacon | H04L 9/3093 |

(Continued)

OTHER PUBLICATIONS

Stochastic Neural Computation I: Computational Elements, by Brown et al. (Brown), published Sep. 2001. (Year: 2001).*

(Continued)

*Primary Examiner* — Vu V Tran
(74) *Attorney, Agent, or Firm* — Barnes & Thornburg LLP

(57) ABSTRACT

A secure computing device includes a secure computing unit configured to execute secure computing on encrypted data obtained by encrypting plaintext represented in a prescribed expression format for stochastic computing in a homomorphic encryption scheme. The secure computing includes a process of acquiring a sum and a process of acquiring a product. The secure computing unit determines a value of each digit of a bit string representing the sum as one of a value of a corresponding digit of a bit string that represents first encrypted data and is represented in the expression format and a value of a corresponding digit of a bit string that represents second encrypted data and is represented in the expression format in the process of acquiring the sum that is a sum of the first encrypted data of the encrypted data and the second encrypted data of the encrypted data.

10 Claims, 6 Drawing Sheets

(56) References Cited

U.S. PATENT DOCUMENTS

2018/0198601 A1\* 7/2018 Laine ................... H04L 9/3239
2018/0375639 A1\* 12/2018 Lauter .................. H04L 9/008

OTHER PUBLICATIONS

Fully Homomorphic Encryption with Polylog Overhead, by Gentry et al., published 2012. (Year: 2012).\*

PCT Search Report and Written Opinion prepared for PCT Application No. PCT/JP2020/045643, completed Feb. 25, 2021.

Gentry, Craig, "A Fully Homomorphic Encryption Scheme", A Dissertation Submitted to The Department of Computer Science and the Committee on Graduate Studies of Stanford University in Partial Fulfillment of the Requirements for the degree of Doctor of Philosophy, 2009.

Chillotti, Ilaria, et al., "TFHE: Fast Fully Homomorphic Encryption Over the Torus," Journal of Cryptology, Apr. 25, 2019.

Martins, P., et al. "A Stochastic Number Representation for Fully Homomorphic Cryptography," 2017, Proceedings IEEE International Workshop on Signal Processing Systems, pp. 1-6.

Liu, D., "Practical Fully Homomorphic Encryption without Noise Reduction, Cryptology ePrint Archive: Report 2015/468," 2015, pp. 1-18.

Ryusuke Koseki, et al., "Homomorphic Encryption for Stochastic Computing", Journal of Cryptographic Engineering, vol. 13, No. 2, Sep. 17, 2022, pp. 251-263.

European Search Report issued for Application No. EP20904536, dated Dec. 5, 2023.

\* cited by examiner

FIG. 10

|  | Scheme | Number of Mult. | Key length | Note |
|---|---|---|---|---|
| Additive HE | EC ElGamal | N/A | 256 bits |  |
| SHE | Ring-LWE | 1-15 | 20K-13M bits | Corresponding to cases with t=2 in Tab.1 |
| FHE | TFHE | ∞ | 16MB | Bootstrapping requires 13 ms per bit |
| PHE | This work | ∞ | 256 bits | Decoded plaintext contains noise due to stochastic computing |

D101

SECURE COMPUTING DEVICE, SECURE COMPUTING METHOD, AND PROGRAM

CROSS REFERENCE TO RELATED APPLICATIONS

This application is a U.S. national stage application under 35 U.S.C. § 371(b) of International Application No. PCT/JP2020/045643 filed Dec. 8, 2020, which claims priority to the Japanese Patent Application No. 2019-232752 filed on Dec. 24, 2019, the disclosures of both of which are hereby expressly incorporated by reference in their entirety.

TECHNICAL FIELD

The present invention relates to a secure computing device, a secure computing method, and a program.

Priority is claimed on Japanese Patent Application No. 2019-232752, filed Dec. 24, 2019, the content of which is incorporated herein by reference.

BACKGROUND ART

In recent years, cloud computing has become popular. Because data is stored on the Internet in the cloud computing, there is an advantage that users can perform calculation without fixing their locations if they are in an environment where a connection to the Internet is possible. On the other hand, in the cloud computing, because data is stored on the Internet, there is a security risk such as data leakage.

Therefore, secure computing may be used to reduce a security risk. The secure computing is technology for performing calculation without decrypting encrypted data. As one of the encryption schemes for secure computing, there is a scheme using encryption called homomorphic encryption. The homomorphic encryption is roughly classified into three encryption schemes: single-operation-based homomorphic encryption, somewhat homomorphic encryption, and fully homomorphic encryption (Patent Literature 1). The single-operation-based homomorphic encryption is an encryption scheme in which only one of an addition process of acquiring a sum and a multiplication process of acquiring a product can be performed in a state in which data is encrypted. The somewhat homomorphic encryption is an encryption scheme in which an addition process and a multiplication process can be performed in a state in which data is encrypted, but the number of operations is limited. The fully homomorphic encryption is an encryption scheme in which an addition process and a multiplication process can be performed in a state in which data is encrypted and there is no limit on the number of operations. Because any calculation can be performed as long as the addition process and the multiplication process can be executed without any limit on the number of operations, it is more desirable to execute the secure computing according to the fully homomorphic encryption than the single-operation-based homomorphic encryption and the somewhat homomorphic encryption.

Therefore, bootstrapping has been conventionally used as technology for performing secure computing using the fully homomorphic encryption. The bootstrapping is technology for removing the limit on the number of operations in somewhat homomorphic encryption. More specifically, it is technology for reducing noise that increases every time an addition operation is performed on information encrypted in the somewhat homomorphic encryption to a certain level. Noise is a random element that is inserted during encryption. The number of random elements also increases due to the addition process. The somewhat homomorphic encryption has a limit on the number of operations because decryption cannot be performed when noise exceeds a prescribed threshold value. Bootstrapping is technology for reducing the noise that has increased to just before this threshold value to a certain level.

CITATION LIST

Non-Patent Literature

[Non-Patent Literature 1]
Craig Gentry "A FULLY HOMOMORPHIC ENCRYPTION SCHEME", A DISSERTATION SUBMITTED TO THE DEPARTMENT OF COMPUTER SCIENCE AND THE COMMITTEE ON GRADUATE STUDIES OF STANFORD UNIVERSITY IN PARTIAL FULFILLMENT OF THE REQUIREMENTS FOR THE DEGREE OF DOCTOR OF PHILOSOPHY, 2009

SUMMARY OF INVENTION

Technical Problem

However, an amount of calculation of bootstrapping may be extremely large and an operation time period required for secure computing according to the fully homomorphic encryption may be controlled by the bootstrapping. For example, around 2009, a time period required for the bootstrapping might have been about 30 minutes while a time period required for the encryption, multiplication, and decryption processes was about milliseconds. Although the time period required for the bootstrapping has been shortened from the time period as of 2009 in recent years, the bootstrapping is still a factor that determines the operation time period. As described above, conventionally, secure computing including a process of acquiring a sum and a process of acquiring a product has a problem that an amount of calculation is significantly increased as compared with an amount of calculation in calculation executed on decrypted data.

In view of the above-described circumstances, an objective of the present invention is to provide technology for limiting an increase in an amount of calculation occurring in secure computing including a sum acquisition process and a product acquisition process.

Solution to Problem

According to an aspect of the present invention, there is provided a secure computing device including: a secure computing unit configured to execute secure computing on encrypted data obtained by encrypting plaintext represented in a prescribed expression format for stochastic computing in a homomorphic encryption scheme, wherein the secure computing includes a process of acquiring a sum and a process of acquiring a product, and wherein the secure computing unit determines a value of each digit of a bit string representing the sum as one of a value of a corresponding digit of a bit string that represents first encrypted data and is represented in the expression format and a value of a corresponding digit of a bit string that represents second encrypted data and is represented in the expression format in the process of acquiring the sum that is a sum of the first encrypted data of the encrypted data and the second encrypted data of the encrypted data.

According to an aspect of the present invention, the secure computing device includes a random bit string generation unit configured to generate a random bit string using a bit string in which a value of each digit is one of two values determined on the basis of a prescribed probability distribution as the random bit string, wherein the secure computing unit determines a value of each digit of a bit string representing the sum as one of a value of a corresponding digit of the bit string that represents the first encrypted data and is represented in the expression format and a value of a corresponding digit of the bit string that represents the second encrypted data and is represented in the expression format on the basis of a value of a corresponding digit of the random bit string in the process of acquiring the sum that is a sum of the first encrypted data and the second encrypted data using the random bit string when the sum is acquired.

According to an aspect of the present invention, in the secure computing device, a bit string represented in the prescribed expression format is a Bernoulli string represented by a unipolar code.

According to an aspect of the present invention, in the secure computing device, a bit string represented in the prescribed expression format is a Bernoulli string represented by a bipolar code.

According to an aspect of the present invention, in the secure computing device, a bit string represented in the prescribed expression format is a Bernoulli string represented by an inverted bipolar code.

According to an aspect of the present invention, in the secure computing device, the secure computing unit acquires a value of each digit of a bit string representing the product using a logical operation according to the expression format in the process of acquiring the product that is a product of the first encrypted data of the encrypted data and the second encrypted data of the encrypted data, the logical operation being a two-input logical operation in which a value of a corresponding digit of the bit string that represents the first encrypted data and is represented in the expression format and a value of a corresponding digit of the bit string that represents the second encrypted data and is represented in the expression format are input.

According to an aspect of the present invention, in the secure computing device, when the expression format is a unipolar code, a logical operation according to the expression format is an AND operation.

According to an aspect of the present invention, in the secure computing device, when the expression format is a unipolar code, a logical operation according to the expression format is an XNOR operation.

According to an aspect of the present invention, in the secure computing device, the secure computing unit concatenates the bit string representing the first encrypted data and the bit string representing the second encrypted data in the process of acquiring the sum that is the sum of the first encrypted data and the second encrypted data and acquires a concatenation result as the sum, and the first encrypted data and the second encrypted data are results obtained by encrypting a plurality of bits of the plaintext into a single cipher.

According to an aspect of the present invention, there is provided a secure computing method including: a secure computing step of executing secure computing on encrypted data obtained by encrypting plaintext represented in a prescribed expression format for stochastic computing in a homomorphic encryption scheme, wherein the secure computing includes a process of acquiring a sum and a process of acquiring a product, and wherein the secure computing step includes determining a value of each digit of a bit string representing the sum as one of a value of a corresponding digit of a bit string that represents first encrypted data and is represented in the expression format and a value of a corresponding digit of a bit string that represents second encrypted data and is represented in the expression format in the process of acquiring the sum that is a sum of the first encrypted data of the encrypted data and the second encrypted data of the encrypted data.

According to an aspect of the present invention, there is provided a program for causing a computer to function as the above-described secure computing device.

Advantageous Effects of Invention

According to the present invention, it is possible to limit an increase in an amount of calculation occurring in secure computing including a sum acquisition process and a product acquisition process.

BRIEF DESCRIPTION OF DRAWINGS

FIG. 10 is a diagram showing an example of an experimental result of performance evaluation of the secure computing system 100 of the embodiment.

DESCRIPTION OF EMBODIMENTS

Embodiment

Figure 1:
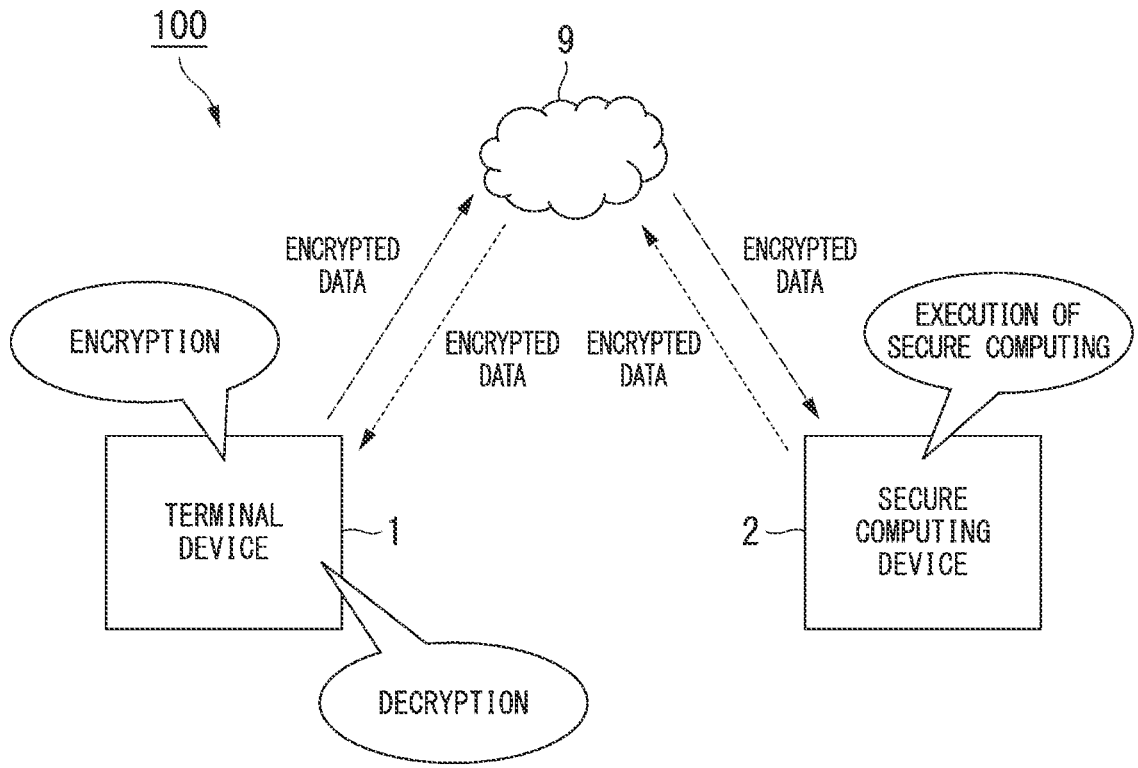
FIG. 1 is a diagram showing an example of a functional configuration of a secure computing system 100 of an embodiment.

FIG. 1 is a diagram showing an example of a functional configuration of a secure computing system 100 of an embodiment.

The secure computing system 100 encrypts plaintext represented in a prescribed expression format for stochastic computing (hereinafter referred to as "stochastically expressed plaintext") in a homomorphic encryption scheme. The secure computing system 100 executes secure computing on stochastically expressed plaintext (hereinafter referred to as "encrypted data") encrypted in the homomorphic encryption scheme.

The expression format for stochastic computing is a data format in which the target data is represented by a bit string having a prescribed number of digits satisfying stochastic computing expression conditions (hereinafter referred to as a "stochastically expressed bit string"). The stochastic computing expression conditions include a condition that the bit string is a bit string indicating a value whose absolute value is 1 or less. The stochastic computing expression conditions include the condition that the bit string is a bit string of bits each having a value of either 0 or 1. The stochastic computing expression conditions include a condition that the bit string is a bit string in which a value indicated by the bit string represents a frequency of appearance of a predetermined value of either 0 or 1 in the bit string.

The stochastically expressed bit string is, for example, a Bernoulli string represented by a unipolar code, a Bernoulli string represented by a bipolar code, or a Bernoulli string represented by an inverted bipolar code.

The Bernoulli string represented by the unipolar code is a bit string in which each bit has a value of either 0 or 1 and a frequency of appearance of a predetermined value of 0 or 1 in the bit string is indicated by a real number of 0 or more and 1 or less. The Bernoulli string represented by the unipolar code indicates a larger value when the frequency of appearance of the predetermined value of 0 or 1 in the bit string is higher.

The Bernoulli string represented by the bipolar code is a bit string in which each bit has a value of either 0 or 1 and a frequency of appearance of a predetermined value of 0 or 1 in the bit string is indicated by a real number of (−1) or more and 1 or less. The Bernoulli string represented by the bipolar code indicates a larger value when the frequency of appearance of the predetermined value of 0 or 1 in the bit string is higher.

The Bernoulli string represented by the inverted bipolar code is a bit string in which each bit has a value of either 0 or 1 and a frequency of appearance of a predetermined value of 0 or 1 in the bit string is indicated by a real number of (−1) or more and 1 or less. The Bernoulli string represented by the inverted bipolar code is different from the Bernoulli string represented by the bipolar code and indicates a smaller value when the frequency of appearance of the predetermined value of 0 or 1 in the bit string is higher.

The homomorphic encryption scheme may be a homomorphic encryption scheme in which only an addition operation is defined, a homomorphic encryption scheme in which only a multiplication operation is defined, or a homomorphic encryption scheme in which addition and multiplication operations are defined. The homomorphic encryption scheme may be, for example, an ideal lattice-based encryption scheme, a fully homomorphic encryption scheme over the integers, a ring-learning with errors (LWE)-based encryption scheme, a Rivest-Shamir-Adleman (RSA) encryption scheme, a Paillier encryption scheme, or an Okamoto-Uchiyama encryption scheme. The homomorphic encryption scheme may be, for example, a Goldwasser-Micali encryption scheme or an ElGamal encryption scheme. The homomorphic encryption scheme may be an elliptical ElGamal encryption scheme (an elliptic curve (EC) ElGamal encryption scheme), a lifted ElGamal encryption scheme, or a lifted EC ElGamal encryption scheme.

The secure computing system 100 includes a terminal device 1 and a secure computing device 2.

The terminal device 1 executes an expression conversion process on plaintext. The expression conversion process is a process of converting a plaintext data format into a prescribed expression format for stochastic computing. The plaintext is converted into stochastically expressed plaintext in the expression conversion process. The plaintext before the expression conversion process is executed is represented by N-ary notation (N is an integer). The plaintext before the expression conversion process is executed is, for example, represented by binary notation.

For the sake of simplicity of description, it is said that the expression format is a unipolar format when the plaintext is converted into a Bernoulli string represented by a unipolar code in the expression conversion process. Also, hereinafter, it is said that the expression format is a bipolar format when the plaintext is converted into a Bernoulli string represented by a bipolar code in the expression conversion process. Also, hereinafter, it is said that the expression format is an inverted bipolar format when the plaintext is converted into a Bernoulli string represented by an inverted bipolar code in the expression conversion process.

The terminal device 1 executes the encryption process. The encryption process is a process of encrypting stochastically expressed plaintext using a prescribed key (hereinafter referred to as an "encryption key") for encrypting data in the homomorphic encryption scheme. The stochastically expressed plaintext is converted into encrypted data by encrypting the stochastically expressed plaintext. The terminal device 1 transmits the encrypted data to the secure computing device 2 via the network 9.

The terminal device 1 acquires data encrypted in the homomorphic encryption scheme as the computing result of the secure computing device 2 via the network 9. The terminal device 1 executes a decryption process. The decryption process is a process of decrypting encrypted data indicating a result of secure computing using a key for encryption (hereinafter referred to as a "decryption key") paired with the encryption key.

The secure computing device 2 receives the encrypted data transmitted by the terminal device 1 via the network 9. The secure computing device 2 performs prescribed secure computing (hereinafter referred to as "target secure computing") including a process of acquiring a sum and a process of acquiring a product with respect to the encrypted data. The target secure computing is calculation that is executed in a state in which the stochastically expressed plaintext is encrypted and may be any calculation as long as it includes a process of acquiring a sum and a process of acquiring a product. The target secure computing is, for example, machine learning using encrypted data as input data, and is machine learning in which a prescribed machine learning model is learned in a state in which the stochastically expressed plaintext is encrypted or inference in machine learning. The secure computing device 2 transmits an execution result of the target secure computing to the terminal device 1.

Figure 2:
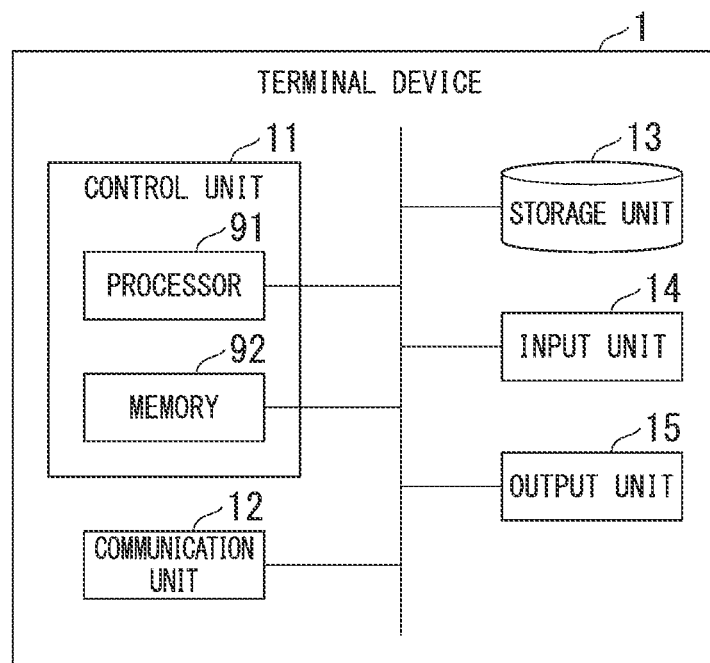
FIG. 2 is a diagram showing an example of a hardware configuration of a terminal device 1 in the embodiment.

FIG. 2 is a diagram showing an example of a hardware configuration of the terminal device 1 in the embodiment.

The terminal device 1 includes a control unit 11 including a processor 91 such as a central processing unit (CPU) and a memory 92 connected by a bus and executes a program. The terminal device 1 functions as a device including a control unit 11, a communication unit 12, a storage unit 13, an input unit 14, and an output unit 15 by executing the program.

The control unit 11 controls an operation of each functional unit provided in its own device (the terminal device 1). The control unit 11 executes, for example, an expression conversion process. The control unit 11 executes, for example, an encryption process. The control unit 11 executes, for example, a decryption process.

The communication unit 12 is configured to include a communication interface for connecting its own device to the network 9. The communication unit 12 communicates with the secure computing device 2 via the network 9. The communication unit 12 transmits/receives encrypted data to/from the secure computing device 2, for example, by communicating with the secure computing device 2. The communication unit 12 transmits the encrypted data to the secure computing device 2, for example, by communicating with the secure computing device 2. The communication unit 12 receives the encrypted data after the target secure computing is performed, for example, by communicating with the secure computing device 2. The communication unit 12 may acquire plaintext transmitted by an external device that transmits the plaintext by communicating with the external device that transmits the plaintext via the network 9.

The storage unit 13 is configured using a storage device such as a magnetic hard disk device or a semiconductor storage device. The storage unit 13 stores, for example, a program that executes an expression conversion process. The storage unit 13 stores, for example, a program that executes an encryption process. The storage unit 13 stores, for example, a program that executes a decryption process. The storage unit 13 stores, for example, an encryption key. The storage unit 13 stores, for example, a decryption key. The storage unit 23 stores, for example, encrypted data.

The input unit 14 is configured to include input devices such as a mouse, a keyboard, and a touch panel. The input unit 14 may be configured as an interface for connecting these input devices to its own device. The input unit 14 receives, for example, an input of plaintext.

The output unit 15 is configured to include display devices such as a cathode ray tube (CRT) display, a liquid crystal display, and an organic electro-luminescence (EL) display. The output unit 15 may be configured as an interface for connecting these display devices to its own device. For example, the output unit 15 displays information input to the input unit 14 such as plaintext.

Figure 3:
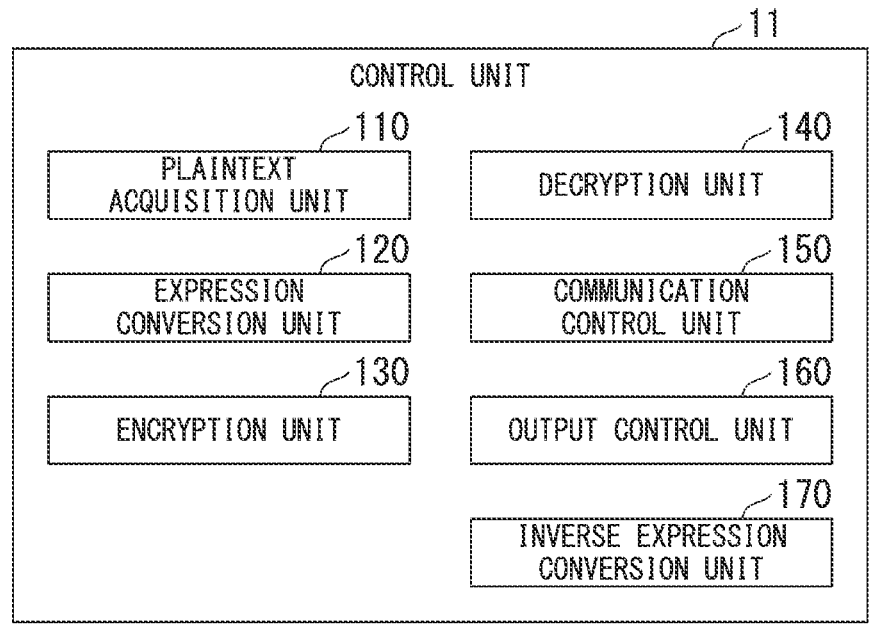
FIG. 3 is a diagram showing an example of a functional configuration of a control unit 11 provided in the terminal device 1 in the embodiment.

FIG. 3 is a diagram showing an example of a functional configuration of the control unit 11 provided in the terminal device 1 in the embodiment.

The control unit 11 includes a plaintext acquisition unit 110, an expression conversion unit 120, an encryption unit 130, a decryption unit 140, a communication control unit 150, an output control unit 160, and an inverse expression conversion unit 170.

The plaintext acquisition unit 110 acquires plaintext via the input unit 14 or the communication unit 12. Hereinafter, for the sake of simplicity of description, the secure computing system 100 will be described using the case where the plaintext is input to the input unit 14 as an example.

The expression conversion unit 120 executes the expression conversion process on the plaintext. By executing the expression conversion process, the plaintext is converted into stochastically expressed plaintext.

The encryption unit 130 executes an encryption process on the stochastically expressed plaintext. By executing the encryption process, the stochastically expressed plaintext is converted into encrypted data.

The decryption unit 140 decrypts the encrypted data. The decrypted data is plaintext represented in a prescribed expression format for stochastic computing.

The communication control unit 150 controls an operation of the communication unit 12. The communication control unit 150 controls the operation of the communication unit 12 so that encrypted data is transmitted and received to and from a communication destination via the communication unit 12.

The output control unit 160 controls the operation of the output unit 15. The output control unit 160 controls the operation of the output unit 15 so that, for example, content input to the input unit 14 is displayed.

The inverse expression conversion unit 170 converts the data decrypted by the decryption unit 140 into plaintext represented by N-ary notation.

Figure 4:
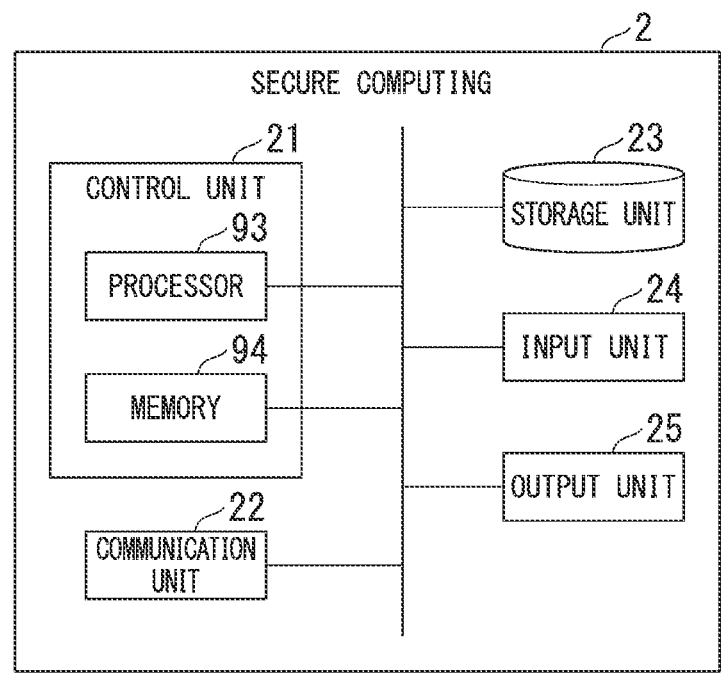
FIG. 4 is a diagram showing an example of a hardware configuration of a secure computing device 2 in the embodiment.

FIG. 4 is a diagram showing an example of a hardware configuration of the secure computing device 2 in the embodiment.

The secure computing device 2 includes a control unit 21 including a processor 93 such as a central processing unit (CPU) and a memory 94 connected by a bus and executes a program. The secure computing device 2 functions as a device including the control unit 21, a communication unit 22, a storage unit 23, an input unit 24, and an output unit 25 by executing the program.

The control unit 21 controls an operation of each functional unit provided in its own device (the secure computing device 2). The control unit 21 executes, for example, target secure computing.

The communication unit 22 includes a communication interface for connecting its own device to the network 9. The communication unit 22 communicates with the terminal device 1 via the network 9. The communication unit 22 receives encrypted data transmitted by the terminal device 1, for example, by communicating with the terminal device 1. Also, the communication unit 22 transmits encrypted data after the target secure computing is performed to the terminal device 1, for example, by communicating with the terminal device 1.

The storage unit 23 is configured using a storage device such as a magnetic hard disk device or a semiconductor storage device. The storage unit 23 stores, for example, a program for target secure computing. The target secure computing program is a program encrypted in advance using a homomorphic encryption scheme. Thus, a value in the target secure computing representing a coefficient of a mathematical formula or the like in the target secure computing is encrypted data. The storage unit 23 stores, for example, received encrypted data. The storage unit 23 stores, for example, the encrypted data during an operation of the target secure computing. The storage unit 23 stores, for example, the encrypted data after the target secure computing is performed.

The input unit 24 is configured to include input devices such as a mouse, a keyboard, and a touch panel. The input unit 24 may be configured as an interface for connecting these input devices to its own device. The input unit 24 receives, for example, an input of the target secure computing program.

The output unit 25 includes display devices such as a cathode ray tube (CRT) display, a liquid crystal display, and an organic electro-luminescence (EL) display. The output unit 25 may be configured as an interface for connecting these display devices to its own device. The output unit 25 displays, for example, information input to the input unit 24.

Figure 5:
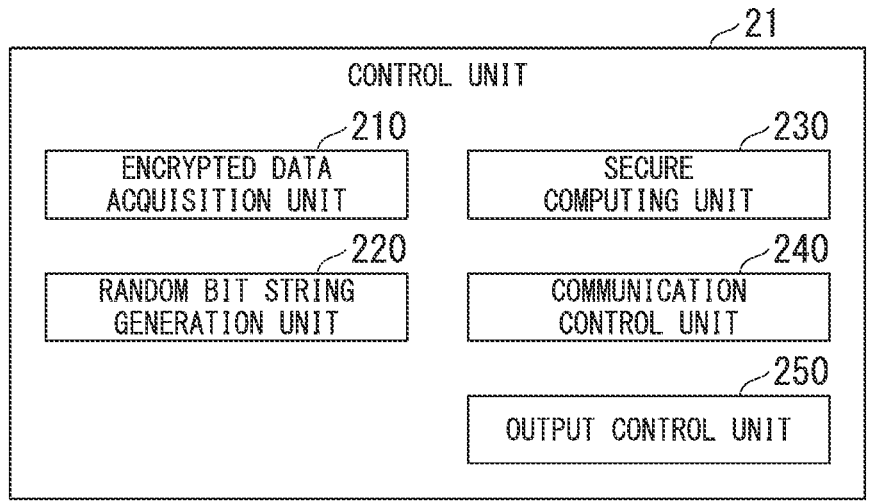
FIG. 5 is a diagram showing an example of a functional configuration of a control unit 21 provided in the secure computing device 2 in the embodiment.

FIG. 5 is a diagram showing an example of a functional configuration of the control unit 21 provided in the secure computing device 2 in the embodiment.

The control unit 21 includes an encrypted data acquisition unit 210, a random bit string generation unit 220, a secure computing unit 230, a communication control unit 240, and an output control unit 250.

The encrypted data acquisition unit 210 acquires encrypted data transmitted by the terminal device 1 via the communication unit 22.

The random bit string generation unit 220 generates a random bit string R. The random bit string R is a bit string in which a value of each digit is one of two values such as 0 or 1 and is a bit string in which the value of each digit is a value determined on the basis of a prescribed probability distribution. For example, a value of a bit included in the random bit string R has 1 at a probability of 50% and 0 at a probability of 50%. In such a case, the prescribed probability distribution is a probability distribution in which the probability that 1 will appear is 50% and the probability that 0 will appear is 50%.

The probability of appearance of 0 and the probability of appearance of 1 do not necessarily have to be the same. For example, 1 may have a probability of 40% and 0 may have a probability of 60%. In such a case, the prescribed probability distribution is a probability distribution in which the probability that 1 will appear is 40% and the probability that 0 will appear is 60%. Hereinafter, for the sake of simplicity of description, the control unit 21 will be described using the case where the value indicated by each bit of the random bit string R is one of two values such as either 0 or 1 and the value of the bit is 1 at a probability of 50% and is 0 at a probability of 50% as an example. The random bit string R generated by the random bit string generation unit 220 is input to the secure computing unit 230.

The secure computing unit 230 executes the target secure computing on the encrypted data using the random bit string R. The secure computing unit 230 executes a secure product acquisition process as a multiplication process in the target secure computing. The secure product acquisition process is a process of acquiring a value (hereinafter referred to as a "product M") indicating a product of values indicated by two pieces of the encrypted data in a state in which the encrypted data is encrypted. The secure product acquisition process is a process of acquiring a value indicating the product of the values indicated by the two pieces of the encrypted data, for example, on a stochastic numerical expression. When the homomorphic encryption scheme used to generate the encrypted data is a homomorphic encryption scheme in which a multiplication operation, an addition operation, or both are defined in advance, a product may be acquired in a multiplication or addition method defined with respect to the homomorphic encryption in advance in the secure product acquisition process. Hereinafter, a secure product acquisition process (hereinafter referred to as a "stochastic secure product acquisition process") of acquiring the product M on the stochastic numerical expression using the two pieces of the encrypted data as a first input value A and a second input value B will be described in more detail. Also, the number of digits of the bit string representing the first input value A, the number of digits of the bit string representing the second input bit string B, and the number of digits of the bit string representing the product M are the same.

The stochastic secure product acquisition process is a process in which a value of each digit of the bit string representing the product M is determined on the basis of a value of the corresponding digit of the bit string representing the first input value A and a value of the corresponding digit of the bit string representing the second input value B. Specifically, the value of each digit of the bit string representing the product M, which is the value output in the stochastic secure product acquisition process, is a value of a prescribed logical operation on two inputs that are inputs of a value of a corresponding digit of the bit string representing the first input value A and a value of a corresponding digit of the bit string representing the second input value B. The stochastic secure product acquisition process is a process according to a prescribed expression format for stochastic computing. For example, when the expression format is a unipolar code, the two-input logical operation is an AND operation. For example, when the expression format is a bipolar code, the two-input logical operation is an XNOR operation.

Figure 6:
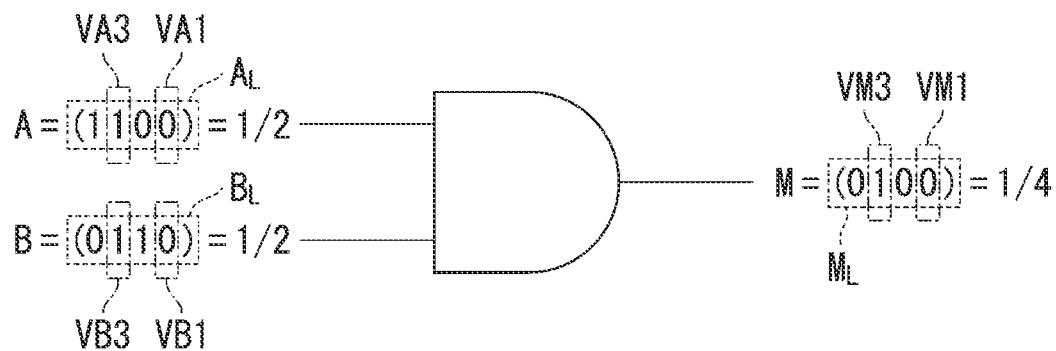
FIG. 6 is an explanatory diagram for describing a stochastic secure product acquisition process in the embodiment using the case where an expression format is a unipolar format as an example.

FIG. 6 is an explanatory diagram for describing the stochastic secure product acquisition process in the embodiment using the case where the expression format is a unipolar format as an example.

FIG. 6 shows that the product M is acquired using a process represented by the AND gate when the first input value A and the second input value B are input as two pieces of encrypted data. Specifically, in the stochastic secure acquisition process, when the expression format is a unipolar format, a value of each digit of a product bit string $M_L$ is a value of an AND operation on a value of a corresponding digit of a first input bit string $A_L$ and a value of a corresponding digit of a second input bit string $B_L$. The product bit string $M_L$ of FIG. 6 is a bit string whose expression format representing the product M is a unipolar format. The first input bit string $A_L$ of FIG. 6 is a bit string whose expression format representing the first input value A is a unipolar format. The second input bit string $B_L$ of FIG. 6 is a bit string whose expression format representing the second input value B is a unipolar format. The number of digits of the first input bit string $A_L$, the number of digits of the second input bit string $B_L$, and the number of digits of the product bit string $M_L$ are the same.

In FIG. 6, the first input value A is specifically (½). In FIG. 6, the first input bit string $A_L$, which is a bit string of a unipolar expression format representing the first input value A, is specifically a four-digit bit string in which the first digit is 0, the second digit is 0, the third digit is 1, and the fourth digit is 1.

In FIG. 6, the second input value B is specifically (½). In FIG. 6, the second input bit string $B_L$, which is a bit string of a unipolar expression format representing the second input value B, is specifically a four-digit bit string in which the first digit is 0, the second digit is 1, the third digit is 1, and the fourth digit is 0.

In FIG. 6, the product M is specifically (¼). In FIG. 6, the product bit string $M_L$, which is a bit string of a unipolar expression format representing the product bit string $M_L$, is specifically a four-digit bit string in which the first digit is 0, the second digit is 0, the third digit is 1, and the fourth digit is 0.

The stochastic secure acquisition process in FIG. 6 will be specifically described. In FIG. 6, for example, a value VM1 of the first digit of the product bit string $M_L$ is a value of an AND operation on a value VA1 of the first digit of the first input bit string $A_L$ and a value VB1 of the first digit of the first input bit string $B_L$. In FIG. 6, for example, a value VM3 of the third digit of the product bit string $M_L$ is a value of an AND operation on a value VA3 of the third digit of the first input bit string $A_L$ and a value VB3 of the third digit of the first input bit string $B_L$.

Figure 7:
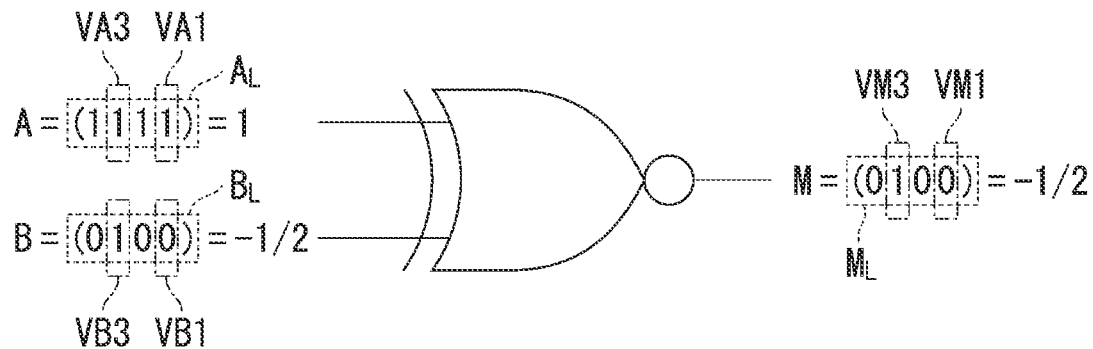
FIG. 7 is an explanatory diagram for describing a stochastic secure product acquisition process in the embodiment using the case where an expression format is a bipolar format as an example.

FIG. 7 is an explanatory diagram for describing the stochastic secure product acquisition process in the embodiment using the case where the expression format is a bipolar format as an example.

FIG. 7 shows that the product M is acquired using a process represented by an XNOR gate when the first input value A and the second input value B are input as two pieces of encrypted data. Specifically, in the stochastic secure acquisition process, when the expression format is a bipolar format, a value of each digit of the product bit string $M_L$ is a value of an XNOR operation on a value of a corresponding digit of the first input bit string $A_L$ and a value of a corresponding digit of the second input bit string $B_L$. The product bit string $M_L$ of FIG. 7 is a bit string whose expression format representing the product M is a bipolar format. The first input bit string $A_L$ of FIG. 7 is a bit string whose expression format representing the first input value A is a bipolar format. The second input bit string $B_L$ of FIG. 7 is a bit string whose expression format representing the second input value B is a bipolar format. The number of digits of the first input bit string $A_L$, the number of digits of the second input bit string $B_L$, and the number of digits of the product bit string $M_L$ are the same.

In FIG. 7, the first input value A is specifically 1. In FIG. 7, the first input bit string $A_L$, which is a bit string of a bipolar expression format representing the first input value A, is specifically a four-digit bit string in which the first digit is 1, the second digit is 1, the third digit is 1, and the fourth digit is 1.

In FIG. 7, the second input value B is specifically (−½). In FIG. 7, the second input bit string $B_L$, which is a bit string of a bipolar expression format representing the second input value B, is specifically a four-digit bit string in which the first digit is 0, the second digit is 0, the third digit is 1, and the fourth digit is 0.

In FIG. 7, the product M is specifically (−½). In FIG. 7, the product bit string $M_L$, which is a bit string of a bipolar expression format representing the product M, is specifically a four-digit bit string in which the first digit is 0, the second digit is 0, the third digit is 1, and the fourth digit is 0.

The stochastic secure acquisition process in FIG. 7 will be specifically described. In FIG. 7, for example, a value VM1 of the first digit of the product bit string $M_L$ is a value of an XNOR operation on a value VA1 of the first digit of the first input bit string $A_L$ and a value VB1 of the first digit of the first input bit string $B_L$. In FIG. 7, for example, a value VM3 of the third digit of the product bit string $M_L$ is a value of an XNOR operation on a value VA3 of the third digit of the first input bit string $A_L$ and a value VB3 of the third digit of the first input bit string $B_L$.

At this point, the description of the process of acquiring the product in the secure computing executed by the secure computing unit 230 ends.

The secure computing unit 230 executes the following secure sum acquisition process instead of the N-ary addition process as the addition process in the target secure computing. The secure sum acquisition process does not depend on the used encryption scheme.

The secure sum acquisition process is a process of acquiring a value indicating a sum of two pieces of encrypted data (hereinafter referred to as a "sum S") in a stochastic numerical expression. In the secure sum acquisition process, the two pieces of the encrypted data and the sum S are represented by a bit string of binary bits. In the secure sum acquisition process, the random bit string R is used. Hereinafter, for the sake of simplicity of description, the secure sum acquisition process will be described using the case where two pieces of encrypted data input in the secure sum acquisition process are a first input value A and a second input value B as an example.

In the secure sum acquisition process, the number of digits of the bit string representing the first input value A, the number of digits of the bit string representing the second input value B, and the number of digits of the bit string representing the sum S are the same. In the secure sum acquisition process, the number of digits of the random bit string R is greater than or equal to the number of digits of the bit string representing the first input value A, the number of digits of the bit string representing the second input value B, and the number of digits of the bit string representing the sum S.

In the secure sum acquisition process, the bit value of the random bit string R indicates one of a bit string representing the first input value A and a bit string representing the second input value B. A value of each digit of the random bit string R in the secure sum acquisition process is shown in more detail as follows. That is, a value of the corresponding digit of the bit string representing the first input value A is used for acquiring a value of the corresponding digit of the sum S or a value of the corresponding digit of the bit string representing the second input value B is used for acquiring a value of the corresponding digit of the sum S.

For example, in the bit value of the random bit string, 1 indicates that the value of the corresponding digit of the bit string representing the first input value A is used for acquiring the value of the corresponding digit of the sum S. For example, in the bit value of the random bit string, 0 indicates that the value of the corresponding digit of the bit string representing the second input value B is used for acquiring the value of the corresponding digit of the sum S.

Hereinafter, for the sake of simplicity of description, the secure sum acquisition process will be described using the case where 1 is a number indicating the first input value A and 0 is a number indicating the second input value B for the bit value of the random bit string R as an example. When 1 is a number indicating the first input value A, this indicates that a value indicating that the corresponding value of the bit string representing the first input value A is used for acquiring the value of the corresponding digit of the sum S is 1. When 0 is a number indicating the second input value B, this indicates that a value indicating that the corresponding value of the bit string representing the second input value B is used for acquiring the value of the corresponding digit of the sum S is 0.

In the secure sum acquisition process, the value of each digit of the bit string representing the sum S is determined on the basis of the value of the corresponding digit of the bit string representing the first input value A, the value of the corresponding digit of the bit string representing the second input value B, and the value of the corresponding digit of the random bit string R. Specifically, in the secure sum acquisition process, the value of each digit of the bit string representing the sum S is determined to be a value of a digit in a bit string indicated by a value of a corresponding digit of the random bit string R between the value of the corresponding digit of the bit string representing the first input value A and the value of the corresponding digit of the bit string representing the second input value B.

Thus, a value of each digit of a sum bit string $S_L$ acquired as a result of the secure sum acquisition process is one value determined on the basis of a value of a corresponding digit of the random bit string R between the value of the corresponding digit of the bit string representing the first input value A and the value of the corresponding digit of the second input value B. The sum bit string $S_L$ is a bit string representing the sum S.

Figure 8:
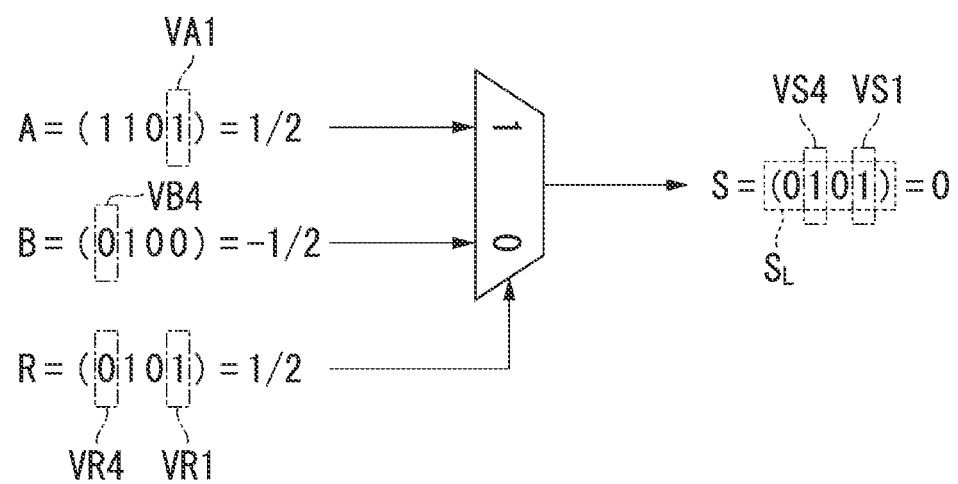
FIG. 8 is an explanatory diagram for describing a secure sum acquisition process in the embodiment.

FIG. 8 is an explanatory diagram for describing the secure sum acquisition process in the embodiment.

A first input bit string $A_L$ of FIG. 8 is a bit string whose expression format representing the first input value A is a bipolar format. A second input bit string $B_L$ of FIG. 6 is a bit string whose expression format representing the second input value B is a bipolar format. The number of digits of the first input bit string $A_L$, the number of digits of the second input bit string $B_L$, the number of digits of the sum bit string $S_L$, and the number of digits of the random bit string R are the same.

In FIG. 8, the first input value A is specifically (½). In FIG. 8, the first input bit string $A_L$, which is a bit string of a bipolar expression format representing the first input value A, is specifically a four-digit bit string in which the first digit is 1, the second digit is 0, the third digit is 1, and the fourth digit is 1.

In FIG. 8, the second input value B is specifically (−½). In FIG. 8, the second input bit string $B_L$, which is a bit string of a bipolar expression format representing the second input value B, is specifically a four-digit bit string in which the first digit is 0, the second digit is 0, the third digit is 1, and the fourth digit is 0.

In FIG. 8, the sum S is specifically 0. In FIG. 8, the sum bit string $S_L$, which is a bit string of a bipolar expression format representing the sum S, is specifically a four-digit bit string in which the first digit is 0, the second digit is 1, the third digit is 0, and the fourth digit is 0.

In FIG. 8, the random bit string R is a four-digit bit string in which the first digit is 1, the second digit is 0, the third digit is 1, and the fourth digit is 0. In this case, the value represented by the random bit string R is (½).

The secure sum acquisition process in FIG. 8 will be specifically described. In FIG. 8, for example, a value VS1 of the first digit of the sum bit string $S_L$ is a value that is a value VA1 of the first digit of the first input bit string $A_L$ because a value represented by a value VR1 of the first digit of the random bit string is 1. In FIG. 8, for example, a value VS4 of the fourth digit of the sum bit string $S_L$ is a value that is a value VB4 of the fourth digit of the second input bit string $B_L$ because a value represented by a value VR4 of the fourth digit of the random bit string is 0.

Description returns to FIG. 5. The communication control unit 240 controls an operation of the communication unit 22. The communication control unit 240 controls the operation of the communication unit 22 so that the communication unit 22 transmits and receives encrypted data to and from a communication destination via the communication unit 22. The communication control unit 240 transmits, for example, encrypted data of a secure computing result of the secure computing unit 230 to the terminal device 1 via the communication unit 22.

The output control unit 250 may control the operation of the output unit 25 so that the encrypted data is output as the secure computing result of the secure computing unit 230.

Figure 9:
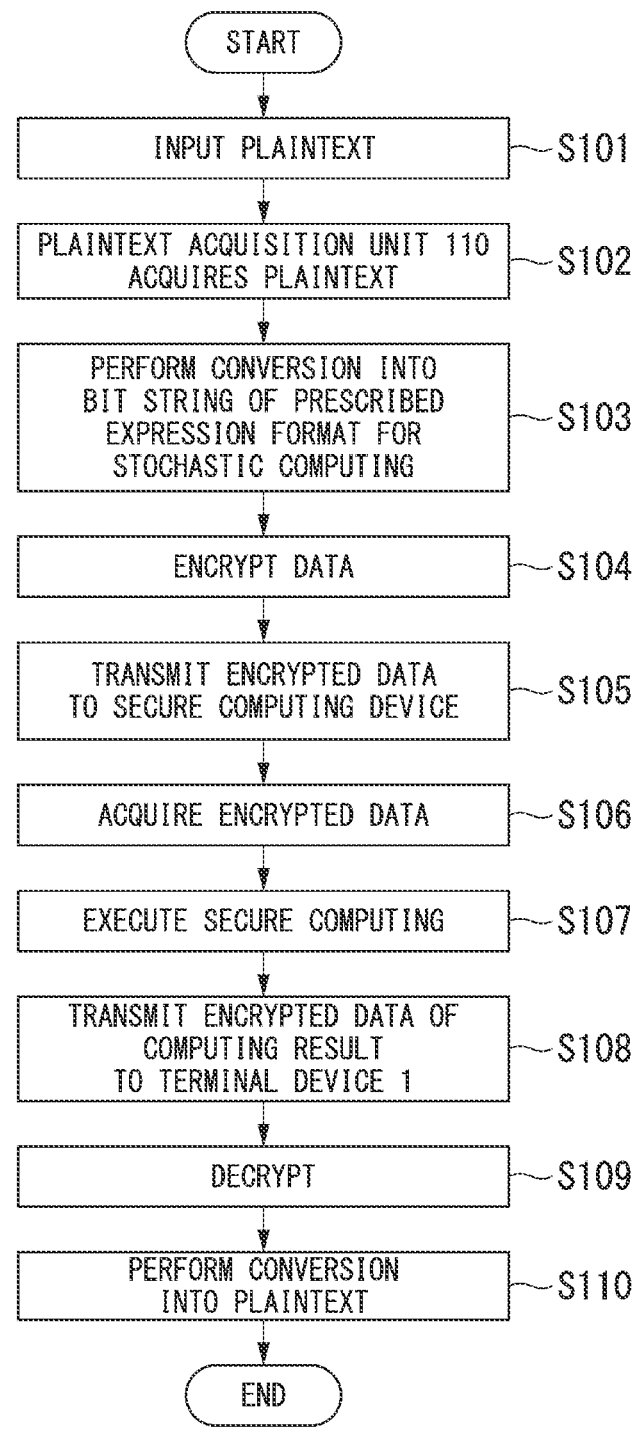
FIG. 9 is a flowchart showing an example of a flow of a process executed by the secure computing system 100 of the embodiment.

FIG. 9 is a flowchart showing an example of a flow of a process executed by the secure computing system 100 of the embodiment.

Plaintext is input to the terminal device 1 via the input unit 14 (step S101). Subsequently, the plaintext acquisition unit 110 acquires the plaintext input in step S110 (step S102). Subsequently, the expression conversion unit 120 executes an expression conversion process on the plaintext acquired by the plaintext acquisition unit 110 (step S103). By executing the expression conversion process, the plaintext is converted into stochastically expressed plaintext. After step S103, the encryption unit 130 converts the stochastically expressed plaintext into encrypted data in an encryption process (step S104). Subsequently, the communication control unit 150 transmits the encrypted data to the secure computing device 2 via the communication unit 12 (step S105).

Subsequently, the encrypted data acquisition unit 210 acquires the encrypted data transmitted by the terminal device 1 via the communication unit 22 (step S106). Subsequently, the secure computing unit 230 executes secure computing (step S107). In step S107, a secure product acquisition process or a secure sum acquisition process is executed in accordance with the target secure computing. When the secure sum acquisition process is executed in the secure computing, the random bit string generation unit 220 first generates the random bit string R.

Subsequently, the secure sum acquisition process is executed using the generated random bit string R. After step S107, the communication control unit 240 transmits encrypted data indicating a computing result of the secure computing to the terminal device 1 via the communication unit 22 (step S108). Subsequently, the decryption unit 140 acquires the encrypted data indicating the computing result of the secure computing via the communication unit 12 and decrypts the acquired encrypted data (step S109). Subsequently, the inverse expression conversion unit 170 converts the decrypted data into plaintext (step S110).

The secure computing system 100 configured as described above acquires a sum of two positive or negative values using the random bit string R in the secure computing on data encrypted using the homomorphic encryption scheme. More specifically, when the sum S is acquired, the value of each digit of the bit string representing the sum S is acquired by executing the following process. The secure computing system 100 determines one of a value of a corresponding digit of a bit string represented in a prescribed expression format in the stochastic computing as a bit string representing the first input value A and a value of a corresponding digit of a bit string represented in a prescribed expression format in the stochastic computing as a bit string representing the second input value B on the basis of the random bit string R. The determined value is the value of the corresponding digit of the bit string representing the sum S. In this way, the secure computing system 100 acquires the sum S by selecting a value representing the sum without executing the addition operation.

Incidentally, in somewhat homomorphic encryption and fully homomorphic encryption, a random element is added to data at the time of encryption. When a process of acquiring a sum of two positive or negative values and a process of acquiring a product in homomorphic encryption are performed in an N-ary addition operation, an added random value (hereinafter referred to as "noise") increases every time the process of acquiring the sum and the process of acquiring the product are executed. On the other hand, the secure computing system 100 acquires a value of a sum or a value of a product by selecting a bit of a bit string representing a value without executing an N-ary addition or multiplication operation in a process of acquiring a sum or a product of two positive or negative values. Thus, in the secure computing system 100, noise does not increase even if the process of acquiring the sum is executed. More precisely, in the secure computing system 100, noise does not occur originally. As described above, because the noise does not increase in the secure computing system 100, a bootstrapping process is unnecessary in the secure computing system 100.

Also, in the secure computing system 100, it is possible to execute a process of acquiring a product and a process of acquiring a sum. The process of acquiring the product corresponds to a multiplication operation. The process of acquiring the sum corresponds to an addition operation. Thus, the secure computing system 100 can execute the secure computing including the process of acquiring the sum and the process of acquiring the product, and can limit an increase in the amount of calculation occurring in the secure computing.

Also, the reason why the increase in the amount of calculation is limited by the secure computing system 100 is that the bootstrapping process is unnecessary as described above. Thus, the secure computing method executed in the secure computing system 100 is different from homomorphic encryption for arithmetic of approximate numbers (HEAAN). The HEAAN is a method of approximating a value.

(Experimental Results)

In the secure computing system 100, a bootstrapping process is unnecessary as described above. Thus, the secure computing system 100 reduces a key length, which is an index indicating an amount of calculation in the secure computing, to a key length that is $10^{\wedge}(-5)$ to $10^{\wedge}(-6)$ times the key length in the fully homomorphic encryption using bootstrapping. This is shown in experimental results to be described below.

<Experimental Results>

Performance related to the secure computing of the secure computing system 100 and performance related to the secure computing of another secure computing method will be described using experimental results. The performance related to the secure computing is, for example, a key length.

In the experiment, the secure computing system 100 performed secure computing using an inverted bipolar (IBP) code under the encryption scheme of EC ElGamal encryption.

One type of secure computing based on another secure computing method is secure computing on data encrypted in an additive homomorphic encryption (additive HE) scheme based on the EC ElGamal encryption scheme. One type of secure computing based on another secure computing method is secure computing on data encrypted in a somewhat homomorphic encryption (SHE) scheme based on the ring-LWE-based encryption scheme. One type of secure computing based on another secure computing method is secure computing on data encrypted in a scheme of fully homomorphic encryption (torus-based fully homomorphic encryption (TFHE)). The performance related to the secure computing is, for example, a key length.

SHE is an encryption scheme in which an upper limit of the available number of multiplication operations in accordance with a parameter is predetermined. An SHE parameter is, for example, a size of a plaintext space. The SHE parameter may be a size of a ciphertext space or a degree of a polynomial.

FIG. 10 is a diagram showing an example of an experimental result of performance evaluation related to the secure computing of the secure computing system 100 of the embodiment. FIG. 10 shows Number of Multi. and the key length as the performance related to the secure computing. Number of Multi. represents an upper limit of the number of multiplication operations that can be executed in the SHE using the used SHE parameter. The used SHE parameter is an SHE parameter used in the experiment hereinafter. N/A indicates that a multiplication operation is not available.

FIG. 10 shows the performance of secure computing (hereinafter referred to as "AHE calculation") on data encrypted in the additive homomorphic encryption (additive HE) scheme based on the EC ElGamal encryption scheme. An AHE computing result shown in FIG. 10 is a result described in Reference Literature 1. According to Reference Literature 1, as shown in FIG. 10, Number of Multi. in the AHE calculation is not available (N/A) and the key length in the AHE calculation is 256 bits.

Reference Literature 1: Ilaria Chillotti, Nicolas Gama. Maria Georgieva, and Malika Izabachene, "TFHE: Fast Fully Homomorphic Encryption Over the Torus", Journal of Cryptology, Apr. 25, 2019

FIG. 10 shows the performance of secure computing (hereinafter referred to as "SHE calculation") on data encrypted in the somewhat homomorphic encryption (SHE) scheme based on the ring-LWE-based encryption scheme. An SHE computing result shown in FIG. 10 is a result described in Reference Literature 1. According to Reference Literature 1, as shown in FIG. 10, Number of Multi. in the SHE calculation is 1 or more and less than 15. According to Reference Literature 1, as shown in FIG. 10, the shortest key length in the SHE calculation is 20 kilobits and the longest key length is 13 megabits. According to reference Literature 1, the result shown in FIG. 10 is the result of the SHE calculation corresponding to the case of t=2 of Tab. 1. Corresponding to the case of t=2 of Tab. 1. indicates corresponding to the case where plaintext 0 or 1 is given.

FIG. 10 shows the performance of secure computing (hereinafter referred to as "TFHE calculation") on data encrypted in the fully homomorphic encryption (TFHE) scheme. A TFHE computing result shown in FIG. 10 is a result described in Reference Literature 1. According to Reference Literature 1, as shown in FIG. 10, Number of Multi. in the TFHE calculation is infinite and the key length is 16 megabits. According to Reference Literature 1, as shown in FIG. 10, in the TFHE calculation, 13 milliseconds are required for a bootstrapping process per bit.

FIG. 10 shows the performance related to the secure computing executed by the secure computing system 100 (hereinafter referred to as "secure computing performance") obtained as a result of an experiment in which the secure computing is executed by the secure computing system 100 (hereinafter referred to as a "secure computing performance evaluation experiment"). In FIG. 10, the secure computing performance obtained as a result of the secure computing performance evaluation experiment is shown in an enclosure D101. FIG. 10 shows that Number of Multi. is infinite and the key length is 256 bits with respect to the secure computing performance obtained as a result of the secure computing performance evaluation experiment. FIG. 10 shows that noise generated due to stochastic computing is included at the time of decryption of plaintext in the secure computing performance evaluation experiment.

Modified Examples

The terminal device 1 and the secure computing device 2 may be implemented using a plurality of information processing devices that are communicatively connected via a network. In this case, functional units included in the terminal device 1 and the secure computing device 2 may be distributed and implemented in a plurality of information processing devices. For example, the random bit string generation unit 220, the encrypted data acquisition unit 210, the secure computing unit 230, and the output control unit 250 may be implemented in different information processing devices.

The terminal device 1 and the secure computing device 2 do not necessarily have to be implemented as different devices. For example, the terminal device 1 and the secure computing device 2 may be implemented as one device having both functions.

Also, all or some of functions of the terminal device 1 and the secure computing device 2 are implemented using hardware such as an application specific integrated circuit (ASIC), a programmable logic device (PLD), and a field programmable gate array (FPGA). The program may be recorded on a computer-readable recording medium. The computer-readable recording medium is, for example, a flexible disk, a magneto-optical disk, a ROM, a portable medium such as a CD-ROM, or a storage device such as a hard disk built in a computer system. The program may be transmitted via a telecommunication circuit.

Also, a first input value A in FIG. 8 is an example of first encrypted data. A second input value B in FIG. 8 is an example of second encrypted data. Also, acquiring a value indicating a product in a stochastic numerical expression is acquiring a product in a stochastic numerical expression. Also, acquiring a value indicating a sum in the stochastic numerical expression is acquiring a sum in the stochastic numerical expression.

Also, the encryption unit 130 does not necessarily have to individually encrypt each bit of the stochastically expressed plaintext into a single cipher when stochastically expressed plaintext obtained by the expression conversion unit 120 is encrypted. The encryption unit 130 may collectively encrypt a plurality of bits into a single cipher.

To collectively encrypt a plurality of bits of the stochastically expressed plaintext into a single cipher, for example, U bits of the stochastically expressed plaintext (U is an integer of 2 or more) are considered to be a U-dimensional vector and the U-dimensional vector is encrypted into a single cipher. Also, considering the U bits as the U-dimensional vector indicates that the U bits are used as single information for an information processing target. Also, to encrypt a plurality of bits of the stochastically expressed plaintext into a single cipher, for example, the U bits of the stochastically expressed plaintext may be considered to be a U-dimensional polynomial and the U-dimensional polynomial may be encrypted into a single cipher. Also, considering the U bits as the U-dimensional polynomial indicates that the U bits are used as single information for an information processing target.

When the U bits are collectively encrypted into a single cipher as described above, an amount of calculation required for encryption by the encryption unit 130 is 1/N of an amount of calculation when each bit of the stochastically expressed plaintext is individually encrypted into a single cipher. Thus, by encrypting a plurality of bits of the stochastically expressed plaintext into a single cipher, the amount of calculation required for encryption is reduced.

Also, when the U bits are collectively encrypted into a single cipher as described above, the amount of calculation in the secure computing unit 230 is also 1/N. Thus, by encrypting a plurality of bits of the stochastically expressed plaintext into a single cipher, the amount of calculation required for the secure computing is reduced.

Hereinafter, the process of encrypting a plurality of bits of the stochastically expressed plaintext into a single cipher is called a packing process. In the process of acquiring the sum of the encrypted data generated in the packing process, a concatenated stochastic addition operation to be described below is executed instead of the process shown in FIG. 8.

<Concatenated Stochastic Addition Operation>

In the secure computing unit 230, a concatenated stochastic addition operation may be executed. Although the concatenated stochastic addition operation is a process of acquiring a sum S, which is a value indicating the sum of two pieces of encrypted data in a stochastic numerical expression, the concatenated stochastic addition operation is a process in which the random bit string R is not used different from the process shown in FIG. 8.

In the concatenated stochastic addition operation, when a value indicating a sum of V-bit encrypted data and W-bit encrypted data is acquired, a process of concatenating the V-bit encrypted data and the W-bit encrypted data (hereinafter referred to as a "concatenation process") is executed. The concatenation process is specifically a process of concatenating V-bit encrypted data and W-bit encrypted data to generate (V+W)-bit data.

The concatenation process is a process of generating 8-bit data "10110101" using encrypted data "1011" and encrypted data "0101," for example, when the encrypted data "1011" and the encrypted data "0101" are concatenated.

The concatenation process is a process of generating 8-bit data "01001111" using the encrypted data "0100" and the encrypted data "1111," for example, when the encrypted data "0100" and the encrypted data "1111" are concatenated.

In this way, the concatenation process is a process of concatenating a bit string representing the other piece of encrypted data to an end of a bit string representing one piece of the encrypted data with respect to the two pieces of the encrypted data to be summed.

In the concatenated stochastic addition operation, data generated in the concatenation process is the sum S. Thus, the secure computing unit 230 acquires a concatenation result as a sum.

Data represented by the stochastic numerical expression can be regarded to be information representing a probability of appearance of 0 or 1. Thus, for example, when a concatenation process of concatenating four-bit information Q to four-bit information P is executed, probabilities of appearance of 0 and 1 in the execution result data are an average between an appearance probability in the information Q and an appearance probability in the information P. Because the numerator of the average corresponds to the process of acquiring the sum, the concatenation process corresponds to a process of acquiring a sum of two pieces of data.

Also, when the concatenated stochastic addition operation is executed in the secure computing unit 230, the process of acquiring the product may be any process as long as the product can be acquired and is, for example, a stochastic secure product acquisition process.

Because the encrypted data used in the concatenated stochastic addition operation is data generated in the packing process, it is a result of encrypting a plurality of bits of plaintext into a single cipher.

Also, a concatenated stochastic addition process of acquiring a sum of first packing data and second packing data is an example of a process of determining a value of each digit of a bit string representing a sum as one of a value of a corresponding digit of a first packing bit string and a value of a corresponding digit of a second packing bit string. The first packing data is encrypted data generated in the packing process. Therefore, the first packing data is an example of the first encrypted data. The second packing data is encrypted data generated in the packing process. Therefore, the second packing data is an example of the second encrypted data. The first packing bit string is a bit string representing the first packing data and is a bit string represented in a stochastic numerical expression format. The second packing bit string is a bit string representing the second packing data and is a bit string represented in a stochastic numerical expression format.

Although embodiments of the present disclosure have been described above in detail with reference to the drawings, specific configurations are not limited to the embodiments and other designs and the like may also be included without departing from the scope and spirit of the present disclosure.

REFERENCE SIGNS LIST

1 Terminal device
2 Secure computing device
9 Network
100 Secure computing system
11 Control unit
12 Communication unit
13 Storage unit
14 Input unit
15 Output unit
91 Processor
92 Memory
110 Plaintext acquisition unit
120 Expression conversion unit
130 Encryption unit
140 Decryption unit
150 Communication control unit
160 Output control unit
170 Inverse expression conversion unit
21 Control unit
22 Communication unit
23 Storage unit
24 Input unit
25 Output unit
93 Processor
94 Memory
210 Encrypted data acquisition unit
220 Random bit string generation unit
230 Secure computing unit
240 Communication control unit
250 Output control unit

The invention claimed is:

1. A secure computing device comprising:
a processor; and
a storage medium having computer program instructions stored thereon, wherein the computer program instructions, when executed by the processor, perform processing of:
executing secure computing on encrypted data obtained by encrypting plaintext represented in a prescribed expression format for stochastic computing in a homomorphic encryption scheme,
wherein the secure computing includes a process of acquiring a sum and a process of acquiring a product, and
wherein the computer program instructions perform processing of:
determining a value of each digit of a bit string representing the sum as one of a value of a corresponding digit of a bit string that represents first encrypted data and is represented in the expression format and a value of a corresponding digit of a bit string that represents second encrypted data and is represented in the expression format in the process of acquiring the sum that is a sum of the first encrypted data of the encrypted data and the second encrypted data of the encrypted data; and
acquiring a value of each digit of a bit string representing the product using a logical operation according to the expression format in the process of acquiring the product that is a product of the first encrypted data of the encrypted data and the second encrypted data of the encrypted data, the logical operation being a two-input logical operation in which a value of a corresponding digit of the bit string that represents the first encrypted data and is represented in the expression format and a value of a corresponding digit of the bit string that represents the second encrypted data and is represented in the expression format are input.

2. The secure computing device according to claim 1, wherein the computer program instructions further perform processing of:
generating a random bit string using a bit string in which a value of each digit is one of two values determined on the basis of a prescribed probability distribution as the random bit string,
wherein the computer program instructions perform processing of:
determining a value of each digit of a bit string representing the sum as one of a value of a corresponding digit of the bit string that represents the first encrypted data and is represented in the expression format and a value of a corresponding digit of the bit string that represents the second encrypted data and is represented in the expression format on the basis of a value of a corresponding digit of the random bit string in the process of acquiring the sum that is a sum of the first encrypted data and the second encrypted data using the random bit string when the sum is acquired.

3. The secure computing device according to claim 2, wherein a bit string represented in the prescribed expression format is a Bernoulli string represented by a unipolar code.

4. The secure computing device according to claim 2, wherein a bit string represented in the prescribed expression format is a Bernoulli string represented by a bipolar code.

5. The secure computing device according to claim 2, wherein a bit string represented in the prescribed expression format is a Bernoulli string represented by an inverted bipolar code.

6. The secure computing device according to claim 1, wherein, when the expression format is a unipolar code, a logical operation according to the expression format is an AND operation.

7. The secure computing device according to claim 1, wherein, when the expression format is a unipolar code, a logical operation according to the expression format is an XNOR operation.

8. The secure computing device according to claim 1, wherein the computer program instructions further perform processing of:
concatenating the bit string representing the first encrypted data and the bit string representing the second encrypted data in the process of acquiring the sum that is the sum of the first encrypted data and the second encrypted data and acquiring a concatenation result as the sum, and
wherein the first encrypted data and the second encrypted data are results obtained by encrypting a plurality of bits of the plaintext into a single cipher.

9. A secure computing method comprising:
executing secure computing on encrypted data obtained by encrypting plaintext represented in a prescribed expression format for stochastic computing in a homomorphic encryption scheme,
wherein the secure computing includes a process of acquiring a sum and a process of acquiring a product, and
wherein the step of executing the secure computing:
determines a value of each digit of a bit string representing the sum as one of a value of a corresponding digit of a bit string that represents first encrypted data and is represented in the expression format and a value of a corresponding digit of a bit string that represents second encrypted data and is represented in the expression format in the process of acquiring the sum that is a sum of the first encrypted data of the encrypted data and the second encrypted data of the encrypted data; and
acquires a value of each digit of a bit string representing the product using a logical operation according to the expression format in the process of acquiring the product that is a product of the first encrypted data of the encrypted data and the second encrypted data of the encrypted data, the logical operation being a two-input logical operation in which a value of a corresponding digit of the bit string that represents the first encrypted data and is represented in the expression format and a value of a corresponding digit of the bit string that represents the second encrypted data and is represented in the expression format are input.

10. A non-temporary computer-readable storage medium device which stores a program for causing a computer to function as the secure computing device according to claim 1.

* * * * *